(12) United States Patent
Liu et al.

(10) Patent No.: US 8,714,369 B2
(45) Date of Patent: May 6, 2014

(54) FURNITURE DISPLAY RACK

(75) Inventors: Lausan Chung-Hsin Liu, Shanghai (CN); Shopo Hsin Tsu Liu, Shanghai (CN); Fibro Tsu Kun Liu, Shanghai (CN)

(73) Assignee: Keysheen Industry (Shanghai) Co., Ltd., Shanghai (CN)

( * ) Notice: Subject to any disclaimer, the term of this patent is extended or adjusted under 35 U.S.C. 154(b) by 105 days.

(21) Appl. No.: 13/425,921

(22) Filed: Mar. 21, 2012

(65) Prior Publication Data

US 2013/0248473 A1 Sep. 26, 2013

(51) Int. Cl.
| | |
|---|---|
| *A47B 43/00* | (2006.01) |
| *A47B 47/00* | (2006.01) |
| *A47B 57/00* | (2006.01) |
| *A47F 7/00* | (2006.01) |
| *A47F 5/00* | (2006.01) |
| *A47F 5/14* | (2006.01) |
| *A47F 7/30* | (2006.01) |
| *A47F 5/10* | (2006.01) |
| *A47F 5/13* | (2006.01) |
| *A47B 45/00* | (2006.01) |
| *B62B 3/02* | (2006.01) |
| *F16M 11/42* | (2006.01) |

(52) U.S. Cl.
CPC ... *A47F 7/30* (2013.01); *A47F 5/10* (2013.01); *A47F 5/137* (2013.01); *A47B 45/00* (2013.01); *B62B 2202/30* (2013.01); *B62B 3/02* (2013.01); *F16M 11/42* (2013.01)
USPC ............. 211/27; 211/175; 211/189; 211/204; 211/206; 211/13.1; 280/79.3; 248/129

(58) Field of Classification Search
CPC ............... A47F 7/30; A47F 7/24; A47F 5/10; A47F 5/13; A47F 7/0042; A47F 5/12; A47F 5/103; A47F 5/137; A47G 25/0624; A47B 45/00; A47B 47/02; A47B 47/027; A47B 47/00; A47B 47/0091; A47B 47/021; A47B 61/003; A47B 31/00; A47B 55/00; B62B 2202/30; B62B 3/10; B62B 3/00; B62B 3/02; B62B 3/04; B62B 3/0606; B62B 11/00; B62B 2202/32; F16B 12/40; F16M 11/00; F16M 11/42; F16M 11/22; F16M 11/24; F16M 11/20; B65F 1/141
USPC ................ 211/85.8, 27, 189, 175, 13.1, 182, 211/41.14, 41.15, 204, 206, 28; 280/79.3; 248/127, 128, 129, 136, 146, 149, 150, 248/151, 158, 424, 172; 206/326
See application file for complete search history.

(56) References Cited

U.S. PATENT DOCUMENTS

| | | | | |
|---|---|---|---|---|
| 893,856 | A | * | 7/1908 | Luppert ........................ 211/27 |
| 1,459,787 | A | * | 6/1923 | McGee ........................ 211/63 |

(Continued)

*Primary Examiner* — Jennifer E Novosad
(74) *Attorney, Agent, or Firm* — Muncy, Geissler, Olds & Lowe, P.C.

(57) ABSTRACT

A furniture display rack aims to hold at least one set of outdoor furniture which includes a table, at least one chair and a parasol. The furniture display rack comprises a first rack, a second rack connected to one end of the first rack and a support rack. The first rack includes a first retaining bar and a first holding space between two ends of the first retaining bar to hold the table. The first retaining bar has an insertion portion insertable by the parasol and two first retaining portions at two ends thereof leaned by the table. The second rack includes a pair of base beams respectively connected to one end of a support post and a second holding space between the two base beams to hold the chair. The furniture display rack thus formed can hold and display the furniture in smaller display space.

5 Claims, 5 Drawing Sheets

(56) References Cited

U.S. PATENT DOCUMENTS

| | | | |
|---|---|---|---|
| 1,966,751 A * | 7/1934 | Brefeld | 211/85.16 |
| 2,419,422 A * | 4/1947 | Schulein | 280/651 |
| 2,596,749 A * | 5/1952 | Webber | 211/70.6 |
| 2,713,424 A | 7/1955 | Thompson | |
| D182,483 S * | 4/1958 | Skinner | D34/21 |
| 2,966,991 A * | 1/1961 | Duffner | 211/60.1 |
| 3,375,960 A * | 4/1968 | Stevens et al. | 224/42.11 |
| 3,462,166 A * | 8/1969 | Fuhrmann | 280/33.997 |
| 3,746,358 A * | 7/1973 | Swick et al. | 280/651 |
| 3,897,876 A | 8/1975 | Feldman | |
| 4,895,381 A | 1/1990 | Farlow | |
| 5,083,805 A * | 1/1992 | Monch et al. | 280/47.35 |
| 5,471,800 A | 12/1995 | Hill et al. | |
| 5,678,973 A * | 10/1997 | Cox | 414/341 |
| 5,871,219 A * | 2/1999 | Elliott | 280/79.3 |
| 6,523,776 B1 * | 2/2003 | Elder | 242/594.4 |
| 6,585,224 B1 * | 7/2003 | Schmidt | 248/640 |
| 6,910,590 B2 * | 6/2005 | Meier | 211/13.1 |
| 7,185,899 B2 * | 3/2007 | Thiede et al. | 280/47.35 |
| 7,270,339 B2 * | 9/2007 | Feick | 280/79.3 |
| 7,578,400 B1 * | 8/2009 | Hartman, Sr. | 211/27 |
| D626,763 S * | 11/2010 | Koh | D6/462 |
| 8,251,379 B2 * | 8/2012 | Watzke | 280/35 |
| 8,342,544 B1 * | 1/2013 | Blewett et al. | 280/79.11 |
| 2003/0173314 A1 * | 9/2003 | Knoll et al. | 211/41.14 |
| 2005/0067360 A1 * | 3/2005 | Darvial | 211/41.14 |
| 2007/0096417 A1 * | 5/2007 | Feick | 280/79.3 |
| 2013/0194662 A1 * | 8/2013 | Kepley, Jr. | 359/443 |

* cited by examiner

FURNITURE DISPLAY RACK

FIELD OF THE INVENTION

The present invention relates to a furniture display rack and particularly to a furniture display rack that can save display space.

BACKGROUND OF THE INVENTION

Furniture articles are general household goods widely used in families and made in varying structures according to different functions, such as tables, chairs, cabinets, lighting fixtures or the like. Some furniture articles, such as tables and chairs, can also be used indoors and outdoors. The tables and chairs being used outdoors, such as at restaurants or swimming pool side, generally serve as resting or social activity facilities for users, such as chatting, eating snacks or the like. In some occasions, a parasol is provided as sunshine or rain barrier. Hence tables and chairs are the most versatile furniture and almost become indispensable for modern people in their daily life. They also are being designed and made in a wide variety of styles to suit different consumers' tastes and preferences. Furniture stores often have to provide a widely variety of selections of tables and chairs to cater different types of customers.

As an old saying goes "Seeing is believing". Consumers often want to see the actual goods of merchandises before making purchase decision. To meet such requirement most furniture stores have selected furniture displayed onsite. Various types of furniture display designs also are available in the prior art. For instance, U.S. Pat. No. 5,471,800 provides a furniture display in an assembly manner to enable consumers to get a total view of the furniture. While it provides a full picture of a total set of selected furniture, it also takes a great deal of display space. Hence the economic-effectiveness is not desirable when only limited display space is available. U.S. Pat. Nos. 2,713,424, 3,897,876 and 4,895,381 also disclose various types of display racks for chairs. They mostly have the chairs stacked on the display rack to save the display space, but not for displaying an entire set of table and chairs, nor a parasol, thus still leave a lot to be desired.

SUMMARY OF THE INVENTION

The primary object of the present invention is to save space of furniture display.

To achieve the foregoing object the invention provides a furniture display rack to hold at least one set of outdoor furniture. The set of outdoor furniture includes a table, at least one chair and a parasol. The furniture display rack comprises a first rack, a second rack connected to one end of the first rack and a support rack. The first rack includes a pair of parallel support posts, a first retaining bar bridging the two support posts and a first holding space between two ends of the first retaining bar to hold the table. The first retaining bar has an insertion portion insertable by the parasol and two first retaining portions at two ends thereof leaned by the table. The second rack includes a pair of base beams respectively connected to one end of the support post and a second holding space between the two base beams to hold the chair. The support rack includes a base frame connected to the second rack and a leaning portion connected to the base frame to support the bottom of the table.

In one aspect each of the support posts includes a bracing portion to hold the parasol.

In another aspect each base beam has at least one universal wheel fastened thereon.

In yet another aspect the first retaining bar includes a first bar with a plurality of first fastening holes to bridge the two support posts, two second bars coupling with the first bar and having respectively the first retaining portion and a plurality of second fastening holes corresponding to the first fastening holes, and a plurality of fastening portions running through the first fastening holes and second fastening holes to prohibit the first retaining bar from extending and retracting.

In yet another aspect the first rack includes a connection bar parallel with the first retaining bar and a holding portion on the connection bar coaxial with the insertion portion.

In yet another aspect the first rack includes a second retaining bar parallel with the first retaining bar, and the second retaining bar has two second retaining portions respectively extended from one end thereof leaned by the table.

The invention thus structured provides many benefits, notably:

The table of the outdoor furniture can be held in the first holding space and confined by the first retaining bar and support rack without moving. The second retaining bar can share the weight born by the first retaining bar. The first and second retaining bars also can be extended or retracted to mate the table with different sizes according to actual requirements. The parasol can be inserted through the insertion portion and leaned on the holding portion or inserted into the bracing portion. The chair can be held in the second holding space to be displayed. As a result, the space for displaying the outdoor furniture can be greatly reduced.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
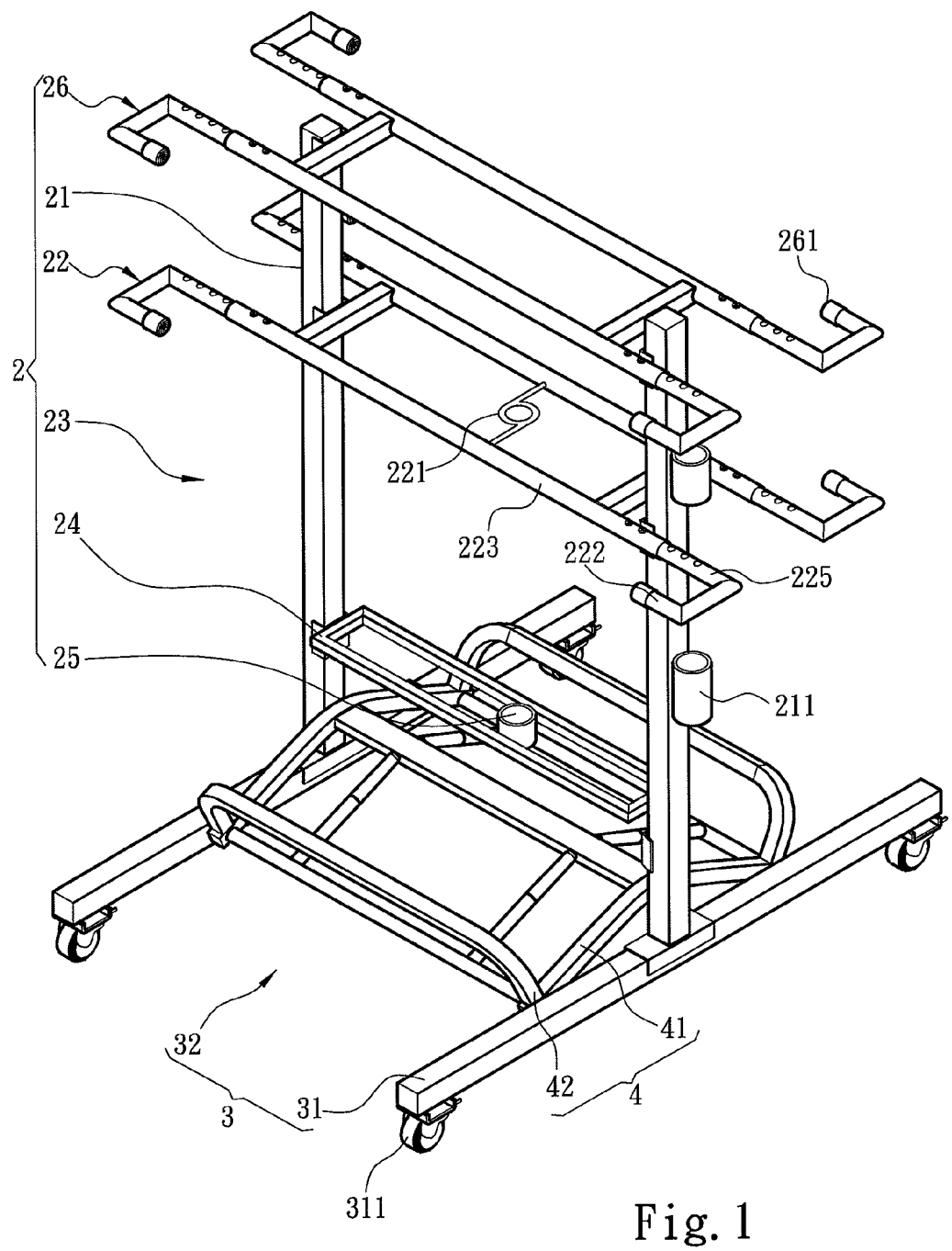
FIG. 1 is a perspective view of the furniture display rack of the invention.
Figure 2:
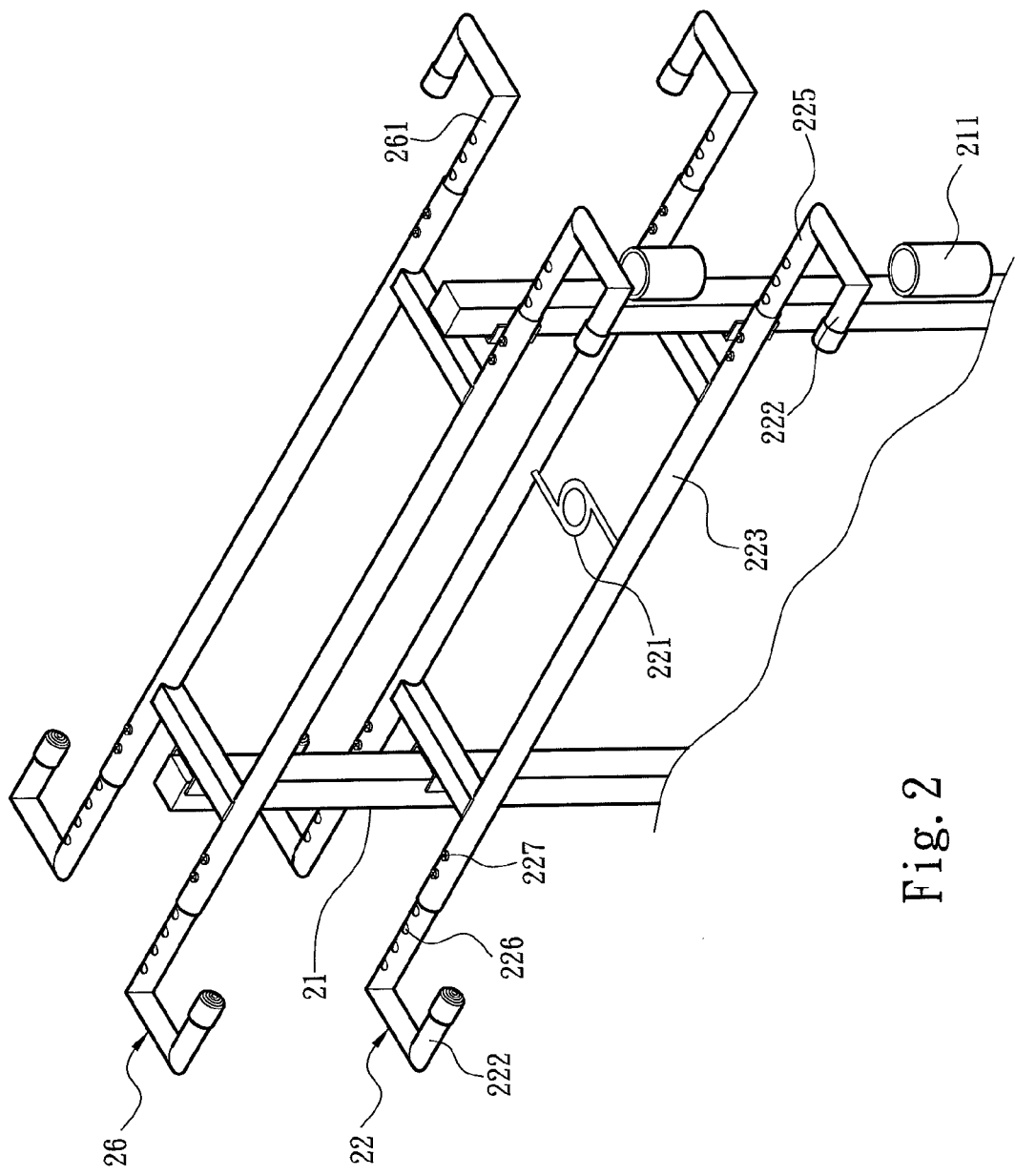
FIGS. 2 and 3 are fragmentary perspective views of the furniture display rack of the invention.
Figure 3:
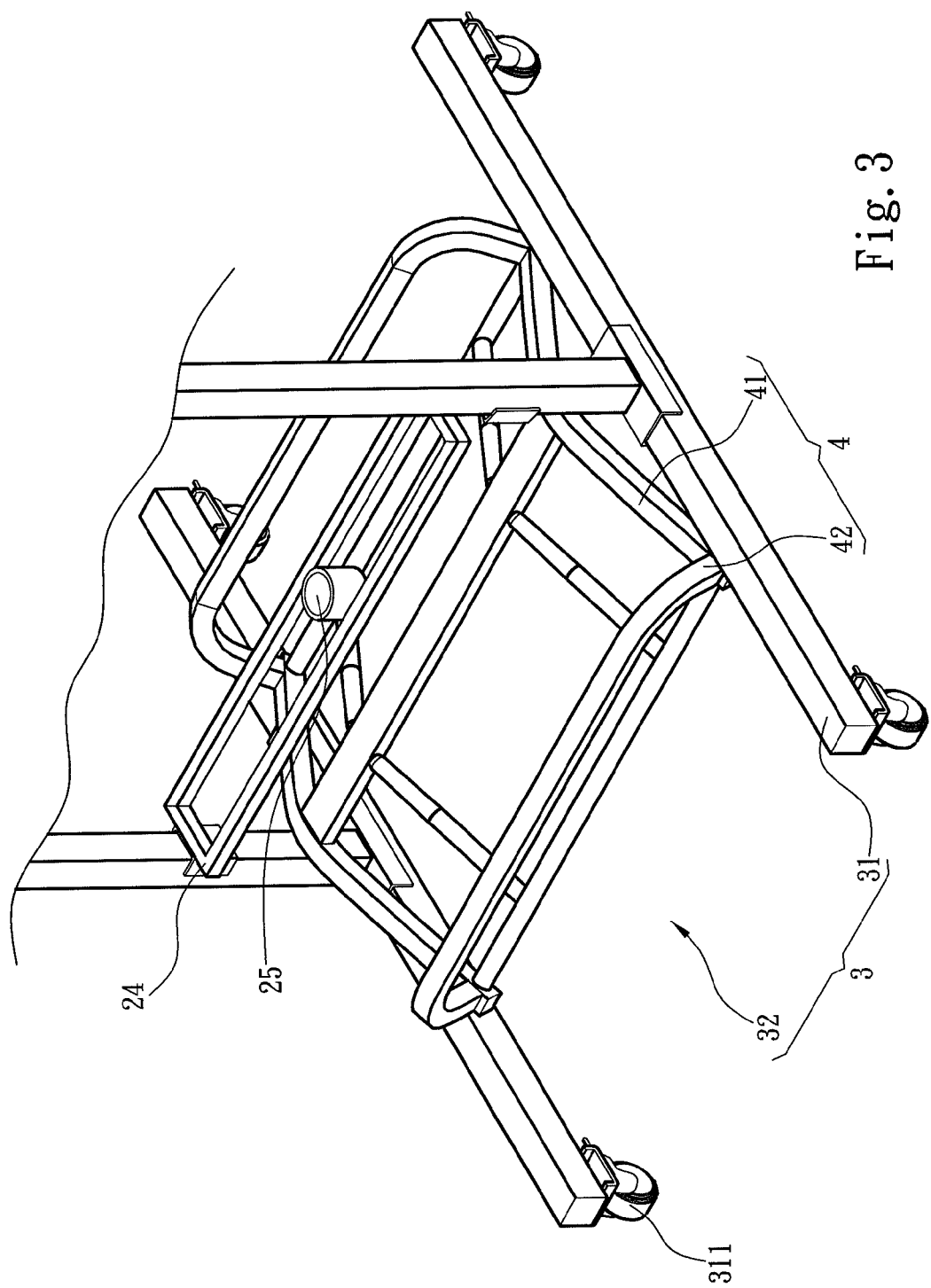

Please refer to FIGS. 1, 2 and 3, the present invention aims to provide a furniture display rack to hold at least one set of outdoor furniture. The set of outdoor furniture (referring to FIG. 5) includes a table 11, at least one chair 12 and a parasol 13. The furniture display rack comprises a first rack 2, a second rack 3 connected to one end of the first rack 2 and a support rack 4. The first rack 2 includes a pair of parallel support posts 21, a first retaining bar 22 bridging the two support posts 21 and a first holding space 23 between two ends of the first retaining bar 22 to hold the table 11. The first retaining bar 22 has an insertion portion 221 insertable by the parasol 13 and two first retaining portions 222 at two ends thereof leaned by the table 11. The second rack 3 includes a pair of base beams 31 respectively connected to one end of the support post 21 and a second holding space 32 between the two base beams 31 to hold the chair 12. The support rack 4 includes a base frame 41 connected to the second rack 3 and a leaning portion 42 connected to the base frame 41 to support the bottom of the table 11.

In an embodiment of the invention, the parasol 13 can be held in the insertion portion 221, but could be wobbling or unstable to provide firm display in such arrangement. In order to provide firmer support for the parasol 13, the first rack 2 further includes a connection bar 24 parallel with the first retaining bar 22 and a holding portion 25 on the connection bar 24 coaxial with the insertion portion 221. Thereby the parasol 13 can insert through the insertion portion 221 and be rested on the holding portion 25 to display at greater steadiness. In order to hold the table 11 firmly during display, the first rack 2 also can include a second retaining bar 26 parallel with the first retaining bar 22 with two ends extended respectively to form a second retaining portion 261 leaned by the table 11. Thereby the table 11 can be firmly held in the first holding space 23. The second retaining bar 26 also can share with the first retaining bar 22 to support the weight of the table 11. The table 11 can be a folding or composite type. The folding table may have the legs folded while being held in the first holding space 23 during display. The composite table may have the legs removed so that only the table top is held in the first holding space 23 during display.

Figure 4:
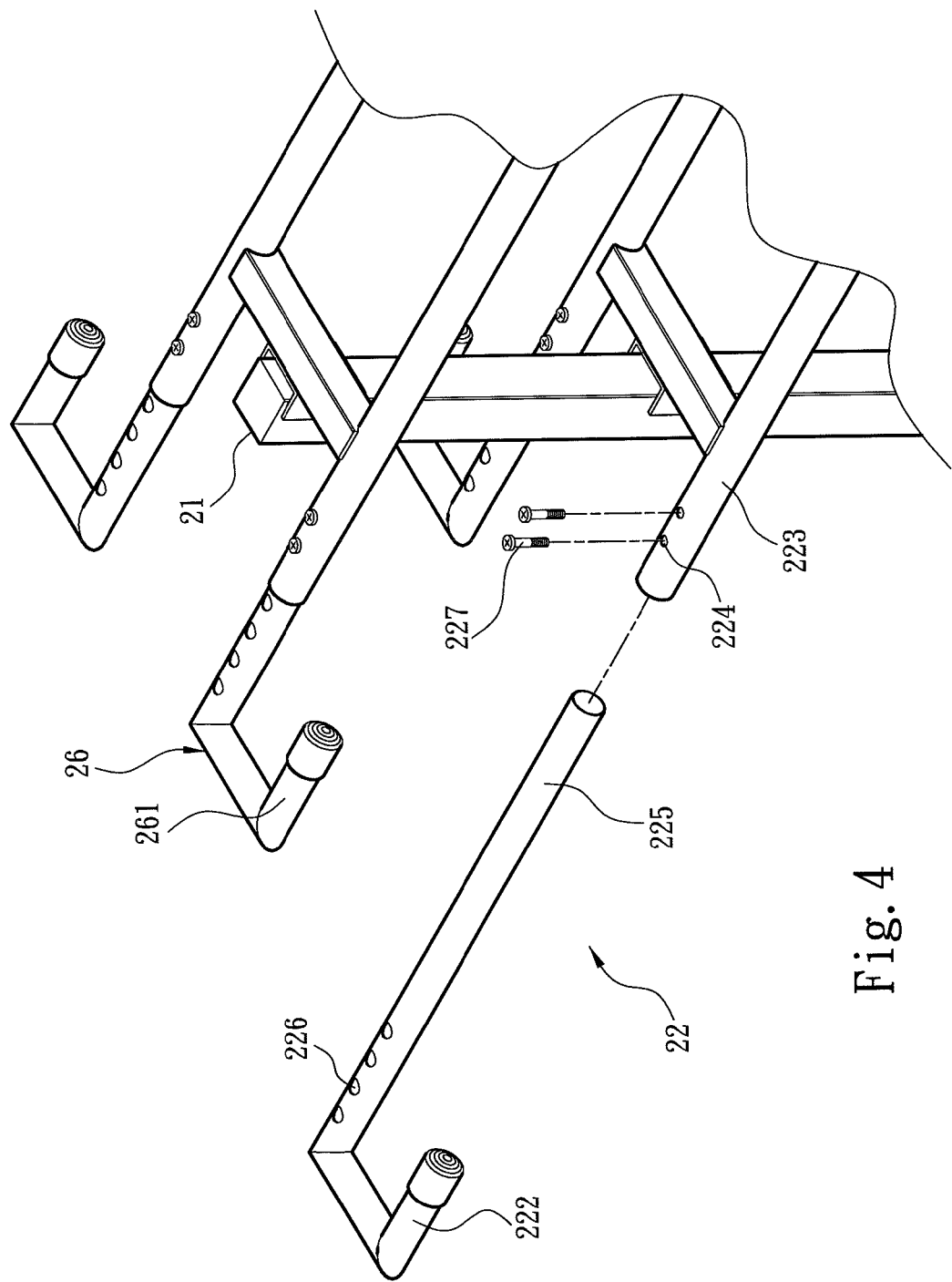
FIG. 4 is a fragmentary exploded view of the furniture display rack of the invention.

Please refer to FIG. 4, when the set of outdoor furniture is held on the furniture display rack for display, total weight could increase and two or more people is needed to move the furniture display rack to an exhibition site. It could be troublesome. Or the furniture display rack has to be moved to the exhibition site first, and then the set of outdoor furniture is assembled on the furniture display rack. To avert the aforesaid trouble of transportation and facilitate moving of the furniture display rack, each base beam 31 can be installed by two universal wheels 311 on two ends thereof to increase the mobility of the furniture display rack, so that the furniture display rack can be moved by merely one person to the intended exhibition site. To accommodate the table with varying sizes, the first retaining bar 22 may further include a first bar 223 with a plurality of first fastening holes 224 formed thereon to bridge the two support posts 21, two second bars 225 coupling with the first bar 223 and having respectively the first retaining portion 222 and a plurality of second fastening holes 226 corresponding to the first fastening holes 224, and a plurality of fastening portions 227 running through the first fastening holes 224 and second fastening holes 226 to prohibit the first retaining bar 22 from extending or retracting. The extensible structure thus formed can change the size of the first holding space 23 to mate the table of varying specifications. In the event that accommodating the table with a greater size is wanted, the second bars 225 can be pulled outwards from the first bar 223 to desired length to align the first fastening holes 224 to the second fastening holes 226, and then the fastening portions 227 can run through the aligned first and second fastening holes 224 and 226, thus the size of the first holding space 23 is increased to hold a bigger table. The fastening portion 227 can be a bolt or a pin. The second retaining bar 26 can also be designed and made extensible as previously discussed to mate the table of a greater size, details are omitted herein.

Figure 5:
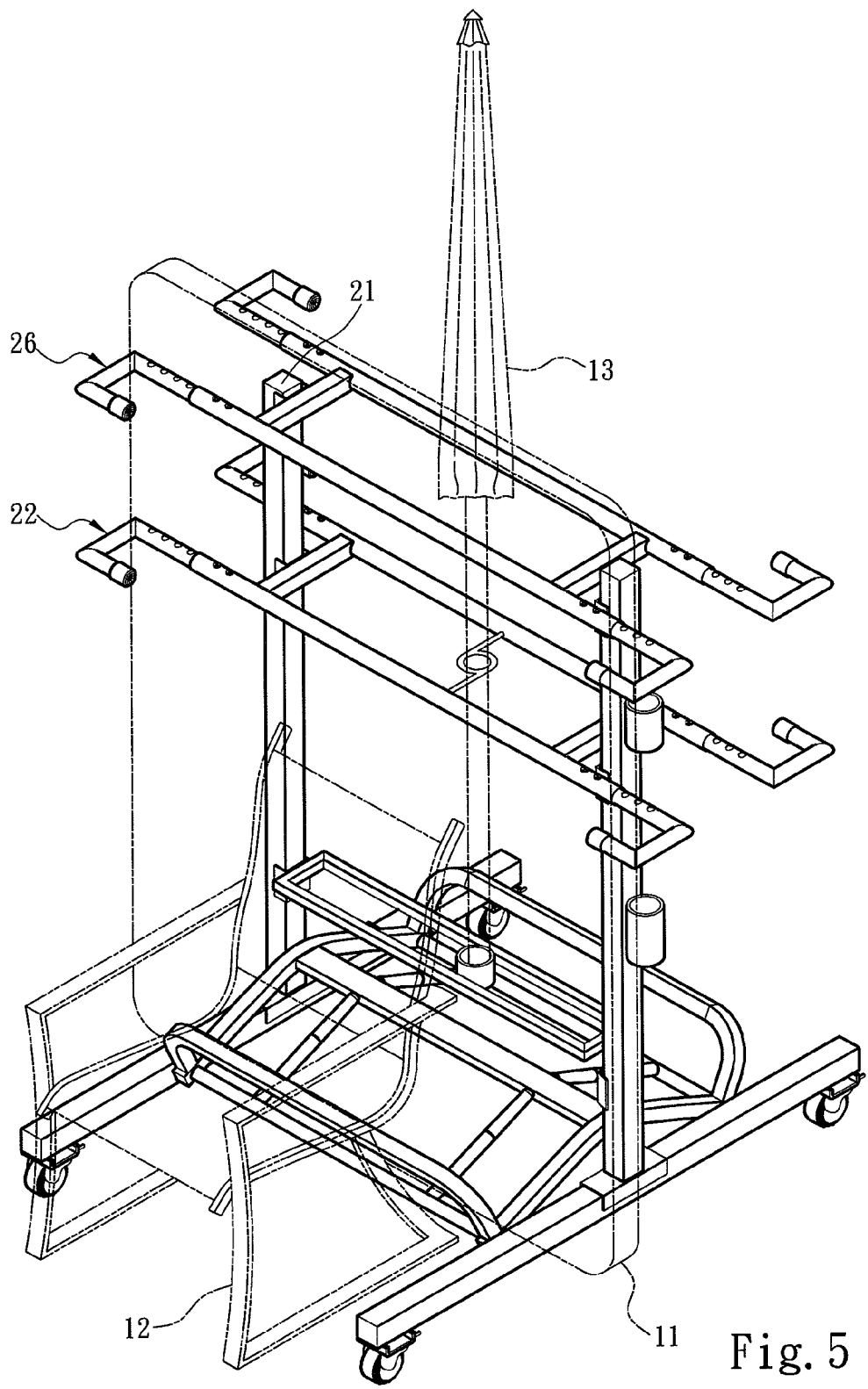
FIG. 5 is a schematic view of the furniture display rack of the invention in a use condition.

Please refer to FIG. 5 for the furniture display rack of the invention in a use condition. The table 11 is held in the first holding space 23 with the bottom thereof supported by the base frame 41 and leaning portion 42 and two sides thereof confined by the first retaining portions 222 of the first retaining bar 22 and second retaining portions 261 of the second retaining bar 26. The parasol 13 can be inserted through the center of the furniture display rack from the above towards the insertion portion 221 and rested on the holding portion 25 to be held firmly on the furniture display rack. And then the chair 12 can be placed in the second holding space 32, thus the entire set of outdoor furniture can be displayed as desired. A picture (not shown in the drawings) of the outdoor furniture in a use condition can also be provided and stuck on the table surface of the table 11 to be seen by consumers to save display space. The invention is not limited to display only one set of outdoor furniture, each of two sides of the furniture display rack can hold one set of the first retaining bar 22, second retaining bar 26, base frame 41 and leaning portion 42. Each of the support posts 21 also can have a bracing portion 211 to hold the parasol of another set of outdoor furniture for displaying. Thus two sets of outdoor furniture can be displayed at the same time in a space smaller than one set of the conventional furniture display rack.

As a conclusion, the table of the outdoor furniture can be held in the first holding space and confined by the first retaining bar and support posts without moving. The first and second retaining bars can jointly support the weight of the furniture, and the first and second retaining bars also can be extended or retracted as required to mate the table with different sizes. In addition, the parasol can be inserted through the insertion portion and rested on the holding portion, or inserted into the bracing portion, and the chair can be held in the second holding space to be displayed. As a result, a great deal of space can be saved for display of the outdoor furniture.

While the preferred embodiments of the invention have been set forth for the purpose of disclosure, they are not the limitations of the invention, modifications of the disclosed embodiments of the invention as well as other embodiments thereof may occur to those skilled in the art. Accordingly, the appended claims are intended to cover all embodiments which do not depart from the spirit and scope of the invention.

The invention claimed is:

1. A furniture display rack for holding at least one set of outdoor furniture comprising:
    a first rack including a pair of parallel support posts, a first retaining bar bridging the pair of support posts and a first holding space between two ends of the first retaining bar for holding a table, the first retaining bar including an insertion portion for inserting a parasol and two first retaining portions at two ends thereof for leaning the table upon;
    a second rack which is connected to one end of the first rack and includes a pair of base beams respectively connected to one end of each of the pair of support posts and a second holding space between the pair of base beams for holding a chair; and
    a support rack which is interposed between the pair of base beams and opposes the first retaining bar and includes a base frame connected to the second rack and a leaning portion connected to the base frame for supporting the bottom of the table,
    wherein the first rack further includes a connection bar parallel with the first retaining bar and a holding portion on the connection bar coaxial with the insertion portion.

2. The furniture display rack as claimed in claim 1, wherein each of the pair of support posts includes a bracing portion for holding the parasol.

3. The furniture display rack as claimed in claim 1, wherein each of the pair of base beams includes at least one wheel.

4. The furniture display rack as claimed in claim 1, wherein the first retaining bar further includes a first bar with a plurality of first fastening holes to bridge the pair of support posts, two second bars coupling with the first bar and including respectively one of the two first retaining portions and a plurality of second fastening holes corresponding to the plurality of first fastening holes, and a plurality of fastening portions running through the plurality of first fastening holes and the plurality of second fastening holes to prohibit the first retaining bar from extending and retracting.

5. The furniture display rack as claimed in claim 1, wherein the first rack further includes a second retaining bar parallel with the first retaining bar, the second retaining bar including two second retaining portions respectively extended from one ends thereof for leaning the table upon.

* * * * *